United States Patent
Yamaguchi et al.

(10) Patent No.: US 8,706,360 B2
(45) Date of Patent: Apr. 22, 2014

(54) DEVICE FOR MEASURING THE DISTANCE BETWEEN A HEAD AND A HEADREST, HEADREST-POSITION ADJUSTING DEVICE USING SAID DEVICE, METHOD FOR MEASURING THE DISTANCE BETWEEN A HEAD AND A HEADREST, AND HEADREST-POSITION ADJUSTING METHOD USING SAID METHOD

(71) Applicant: Fujikura Ltd., Tokyo (JP)

(72) Inventors: Yuichiro Yamaguchi, Sakura (JP); Ryouhei Sakurai, Sakura (JP); Takuya Osaki, Sakura (JP); Yuki Noguchi, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 13/724,657

(22) Filed: Dec. 21, 2012

(65) Prior Publication Data

US 2013/0116893 A1 May 9, 2013

Related U.S. Application Data

(63) Continuation of application No. PCT/JP2011/062474, filed on May 31, 2011.

(30) Foreign Application Priority Data

Jun. 23, 2010 (JP) ................................. 2010-142589

(51) Int. Cl.
*B60N 2/48* (2006.01)
*B60R 21/055* (2006.01)

(52) U.S. Cl.
USPC ............................................. 701/49; 701/45

(58) Field of Classification Search
CPC ........ B60N 2/002; B60N 2/02; B60N 2/0252; B60N 2/48; B60N 2/4802; B60N 2/4805; B60N 2/4808; B60N 2/4811; B60N 2/4814; B60N 2/4817; B60N 2/482; B60N 2/4823; B60N 2/4826; B60N 2/4829

USPC ........................................................ 701/45, 49
See application file for complete search history.

(56) References Cited

U.S. PATENT DOCUMENTS 6,746,078 B2 * 6/2004 Breed ....................... 297/216.12
7,044,554 B2 * 5/2006 Furtado et al. ................ 297/376

(Continued)

FOREIGN PATENT DOCUMENTS

| JP | 2006-181233 A | 7/2006 |
| JP | 2007-131026 A | 5/2007 |

(Continued)

OTHER PUBLICATIONS

International Search Report for PCT/JP2011/062474, mailing date Jul. 19, 2011.

*Primary Examiner* — Mary Cheung
*Assistant Examiner* — Atul Trivedi
(74) *Attorney, Agent, or Firm* — Westerman, Hattori, Daniels & Adrian, LLP (57) ABSTRACT

Disclosed is a headrest position adjusting device provided with a distance measuring device and drive motor units. The distance measuring device is provided with a plurality of detection electrodes and a detection circuit including a plurality of capacitance detection circuits and a computation circuit. The computation circuit uses capacitance values, position information from the detection electrodes, and a high-degree function with a degree of at least 3 to compute a high-degree curve in a two-dimensional coordinate system with capacitance on the y-axis and detection-electrode position on the x-axis. The computation circuit computes the highest-degree coefficient of the high-degree curve and determines the distance between a head and a front part of a headrest on the basis of the computed highest-degree coefficient. On the basis of the measurement result, the headrest position adjusting device moves the front part of the headrest towards the front or back of a vehicle.

6 Claims, 6 Drawing Sheets

(56) References Cited

U.S. PATENT DOCUMENTS

| | | | |
|---|---|---|---|
| 7,484,797 B2 * | 2/2009 | Akaike et al. | 297/216.12 |
| 7,770,967 B2 * | 8/2010 | Hirota et al. | 297/216.12 |
| 7,967,377 B2 * | 6/2011 | Truckenbrodt et al. | 297/217.3 |
| 8,103,415 B2 * | 1/2012 | Sakai et al. | 701/49 |
| 2003/0015898 A1 * | 1/2003 | Breed | 297/216.12 |
| 2005/0264051 A1 * | 12/2005 | Lawall et al. | 297/216.12 |
| 2006/0164254 A1 * | 7/2006 | Kamizono et al. | 340/667 |
| 2006/0175881 A1 * | 8/2006 | Akaike et al. | 297/216.12 |
| 2007/0135984 A1 * | 6/2007 | Breed et al. | 701/45 |
| 2007/0176473 A1 * | 8/2007 | Sakai et al. | 297/216.12 |
| 2007/0267909 A1 * | 11/2007 | Truckenbrodt et al. | 297/410 |
| 2008/0004775 A1 | 1/2008 | Iyoda | |
| 2008/0042477 A1 * | 2/2008 | Breed | 297/216.12 |
| 2008/0067841 A1 * | 3/2008 | Matsubayashi et al. | 297/216.12 |
| 2008/0122454 A1 * | 5/2008 | Kato | 324/661 |
| 2008/0228359 A1 * | 9/2008 | Uchida et al. | 701/49 |
| 2009/0069985 A1 * | 3/2009 | Sakai et al. | 701/49 |
| 2009/0096468 A1 * | 4/2009 | Hirota et al. | 324/681 |
| 2009/0121526 A1 * | 5/2009 | Akaike et al. | 297/216.12 |
| 2009/0265063 A1 * | 10/2009 | Kasugai et al. | 701/49 |
| 2010/0140992 A1 * | 6/2010 | Yamaguchi | 297/217.3 |
| 2010/0148559 A1 * | 6/2010 | Prokop et al. | 297/391 |
| 2010/0225153 A1 * | 9/2010 | Togura et al. | 297/410 |
| 2010/0231023 A1 * | 9/2010 | Wuerstlein et al. | 297/410 |
| 2011/0264332 A1 * | 10/2011 | Yamaguchi et al. | 701/49 |
| 2011/0316318 A1 * | 12/2011 | Yamaguchi et al. | 297/410 |
| 2012/0025850 A1 * | 2/2012 | Yamaguchi et al. | 324/679 |
| 2012/0032488 A1 * | 2/2012 | Noguchi et al. | 297/391 |
| 2012/0032691 A1 * | 2/2012 | Yamaguchi et al. | 324/662 |
| 2012/0041648 A1 * | 2/2012 | Yamaguchi et al. | 701/49 |
| 2012/0043975 A1 * | 2/2012 | Wuerstlein et al. | 324/671 |
| 2012/0261969 A1 * | 10/2012 | Osaki et al. | 297/410 |
| 2013/0116893 A1 * | 5/2013 | Yamaguchi et al. | 701/49 |

FOREIGN PATENT DOCUMENTS

| | | |
|---|---|---|
| JP | 2007-203759 A | 8/2007 |
| JP | 4018112 B2 | 12/2007 |
| WO | 2009/078464 A1 | 6/2009 |

* cited by examiner

DEVICE FOR MEASURING THE DISTANCE BETWEEN A HEAD AND A HEADREST, HEADREST-POSITION ADJUSTING DEVICE USING SAID DEVICE, METHOD FOR MEASURING THE DISTANCE BETWEEN A HEAD AND A HEADREST, AND HEADREST-POSITION ADJUSTING METHOD USING SAID METHOD

CROSS REFERENCE TO RELATED APPLICATIONS

This application is a continuation application of PCT application No. PCT/JP2011/062474, filed on May 31, 2011, which is based on and claims the benefit of priority from prior Japanese Patent Application No. 2010-142589, filed on Jun. 23, 2010, the entire contents of which are incorporated herein by reference.

BACKGROUND OF THE INVENTION

1. Field of the Invention

The present invention relates to a device for measuring the distance between a head and a headrest, headrest position adjusting device using said device, method for measuring the distance between a head and a headrest, and headrest-position adjusting method using said method.

2. Description of the Related Art

Conventionally, a headrest device is known as a device for control or adjust the position of a headrest arranged on a seat of a vehicle such as an automobile, etc. (for example, see JP A-2006-181233 (pp. 2-9, and FIGS. 1-13)). This headrest device is provided with a receiving portion for receiving a head of a vehicle occupant sitting on the seat of the vehicle, and a drive unit that enables the receiving portion to move near to the position of the head.

The drive unit is provided with a sensor arranged in the receiving portion and sensing a relative position of the head, a connecting mechanism constructed to move the receiving portion back and forth, and up and down relative to the seat of the vehicle, and controlling means for driving and controlling the connecting mechanism. The connecting means move the receiving portion relatively to a first relatively-adjacent position in which a sensor shows excellent sensing sensitivity, and then to a second relatively-adjacent position based on the sensing signal from the sensor.

A vehicle headrest device is known (for example, see JP 4018112 (pp. 1-15, and FIGS. 1-12). When this vehicle headrest device moves the front portion of the headrest in a direction to be fully opened, ECU of the device judges based on the detection result of a capacitance sensor that the front portion of the headrest comes close to the head of a vehicle occupant, and stops the front portion of the headrest.

Concretely, ECU judges based on change in an absolute capacitance relative to the standard capacitance of a capacitance sensor that the front portion of the headrest comes close to the head of a vehicle occupant. Alternatively, the headrest device is constructed such that ECU judges based on change in capacitance value of a capacitance sensor that the front portion of the headrest comes close to the head of a vehicle occupant.

However, the headrest device disclosed in JP A-2006-181233 described above measures the distance between the head and the receiving portion based on the absolute value of the capacitance which is easily affected by outer noise due to change in environment such as temperature or humidity sensed by one sensor. Therefore, there is a problem of difficulty in measuring the precise distance between the head and the headrest.

Further, in the vehicle headrest device disclosed in JP 4018112 described above, the distance between the headrest and the head of the vehicle occupant is measured based on change in capacitance when the front portion of the headrest is minutely moved back and forth. By doing so, the distance can be measured without being affected by outer noise. However, in this case, it is necessary to move constantly the front portion of the headrest. For that reason, the headrest moves wastefully, which makes the vehicle occupant feel uncomfortable. Further, there is a problem that makes it difficult to measure accurately the distance when the position of the headrest moves during measurement.

SUMMARY OF THE INVENTION

It is an object of the present invention is to provide a device for measuring the distance between a headrest and a head, which makes it possible to measure accurately the distance between a headrest and a head without being affected by outer noise, and to prevent wasteful movement of the headrest and adjust the position of the headrest, headrest position adjusting device using said distance-measuring device, method for measuring the distance between a head and a headrest, and headrest-position adjusting method using said distance-measuring method.

According to the present invention, there is provided a device for measuring the distance between a headrest and a head of the present invention comprises: at least three sensing electrodes for sensing capacitance between a head of a human body sitting on the seat and the headrest, which are provided in a headrest arranged on a seat of a vehicle; detecting means for detecting capacitance values based on the capacitances from the sensing electrodes; calculating means for calculating a high-degree curve connecting continuously said capacitance values as actual fixed points in a two-dimensional coordinate system with capacitance values on y-axis and positions of the sensing electrodes on x-axis and calculating a high-degree coefficient of the high-degree curve, using the capacitance values detected by the detecting means and position information showing an arrangement position of each of the sensing electrodes in the headrest, and a high-degree function of at least three degree; and distance measuring means for measuring a distance between the headrest and the head based on the result calculated by the calculating means.

Incidentally, for example, the plurality of sensing electrodes are preferably arranged along a height direction of the headrest.

Further, the headrest position adjusting device according to the present invention comprises: the device for measuring a distance between a headrest and a head according to the present invention described above; and position adjusting means for adjusting a position of the headrest by moving the headrest back and forth with regard to a vehicle based on the measurement result from the device for measuring a distance between a headrest and a head.

The method for measuring a distance between a headrest and a head according to the present invention comprises: a step of sensing capacitance between a front portion of a head of a vehicle occupant of a human body sitting in a seat of a vehicle and a headrest by means of at least three sensing electrodes which are provided in the headrest arranged on the seat of the vehicle; a step of detecting capacitance value based on the capacitance sensed by said sensing step; a step of calculating a high-degree curve connecting continuously said capacitance values as actual fixed points in a two-dimensional coordinate system with capacitance values on y-axis and positions of the sensing electrodes on x-axis and calculating a high-degree coefficient of the high-degree curve, using the capacitance values detected in the detecting step and position information showing an arrangement position of each of the sensing electrodes in the headrest, and a high-degree function of at least three degree, and a preset high-degree function of at least three degree; and a step of measuring a distance between the headrest and the head based on the result calculated by said calculating step.

Incidentally, the plurality of sensing electrodes are arranged along a height direction of the headrest, and the method further comprises, prior to said calculating step, a step of adjusting a position of the headrest in the height direction based on the capacitance value detected in said detecting step and the position information, such that the maximum of the detected capacitance value resides between the capacitance value detected by the sensing electrode located at a highest position of the headrest among the plurality of sensing electrodes and the capacitance value detected by the sensing electrode located at a lowest position of the headrest among the plurality of sensing electrodes.

The method for adjusting a position of a headrest according to the present invention comprises the method for measuring a distance between a headrest and a head according to the present invention described above, and further comprises said step of adjusting the position of the headrest by moving the headrest back and forth with regard to a vehicle based on the measurement result from the method for measuring the distance.

According to the present invention, it is possible to accurately measure the distance between a head and a headrest without being affected by external noise, to prevent unnecessary movements of the headrest, and to adjust automatically the position thereof.

DETAILED DESCRIPTION OF THE EMBODIMENTS

There will now be described preferred embodiments of a device for measuring the distance between a head and a headrest, headrest position adjusting device using said device, method for measuring the distance between a head and a headrest, and headrest-position adjusting method using said method according to the present invention with reference to the appended drawings.

Figure 1:
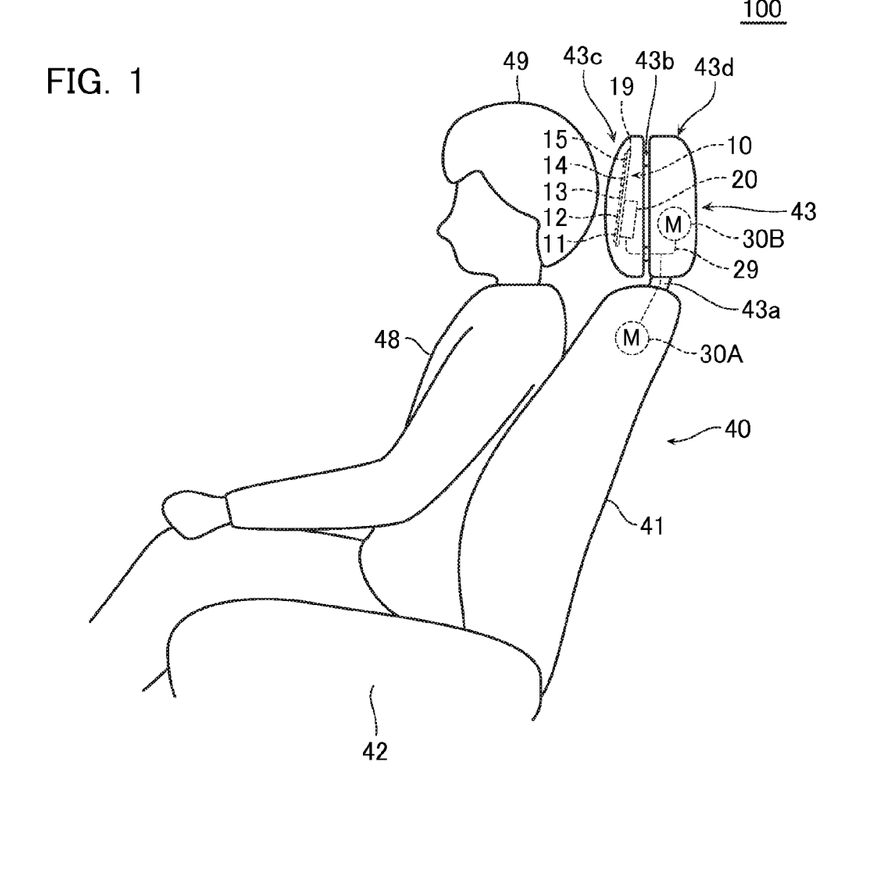
FIG. 1 is a schematic view showing an example of a seat of a vehicle provided with a headrest-position adjusting device having a device for measuring a distance between a head and a headrest according to one embodiment of the present invention.
Figure 2:
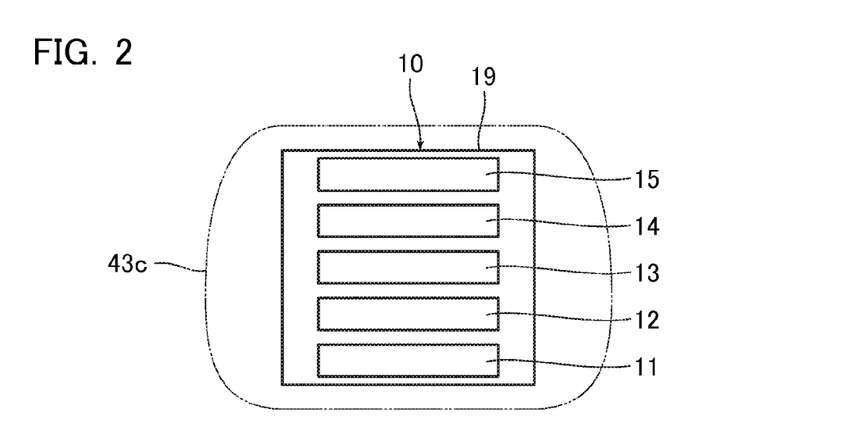
FIG. 2 is an explanatory view showing an example of arrangement in the headrest of a device for measuring a distance between a head and a headrest according to one embodiment of the present invention.

FIG. 1 is a schematic view showing an example of a seat of a vehicle provided with a headrest-position adjusting device having a device for measuring a distance between a head and a headrest according to one embodiment of the present invention. FIG. 2 is an explanatory view showing an example of arrangement in the headrest of a device for measuring a distance between a head and a headrest according to one embodiment of the present invention.

Figure 3:
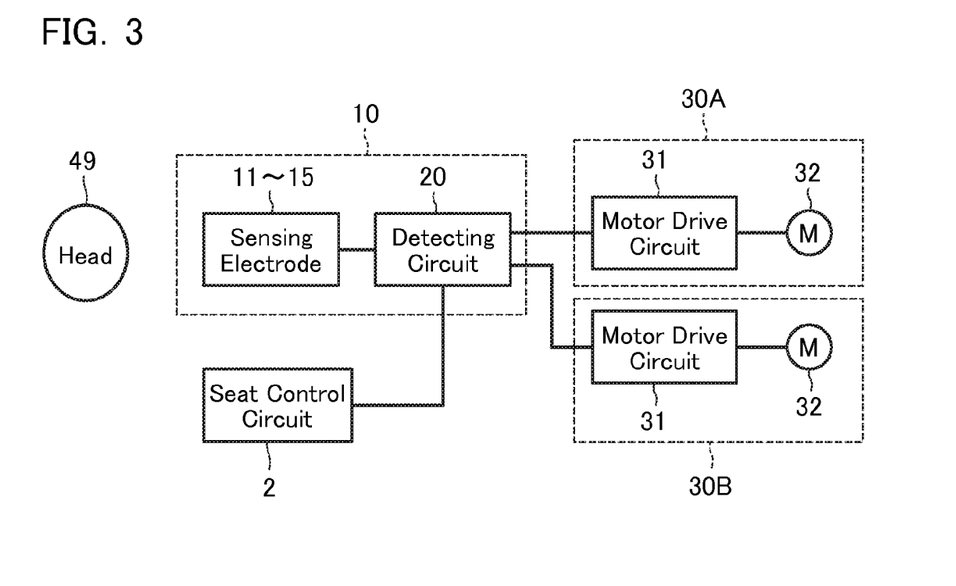
FIG. 3 is a block diagram showing an example of a total structure of a headrest-position adjusting device according to one embodiment of the present invention.
Figure 4:
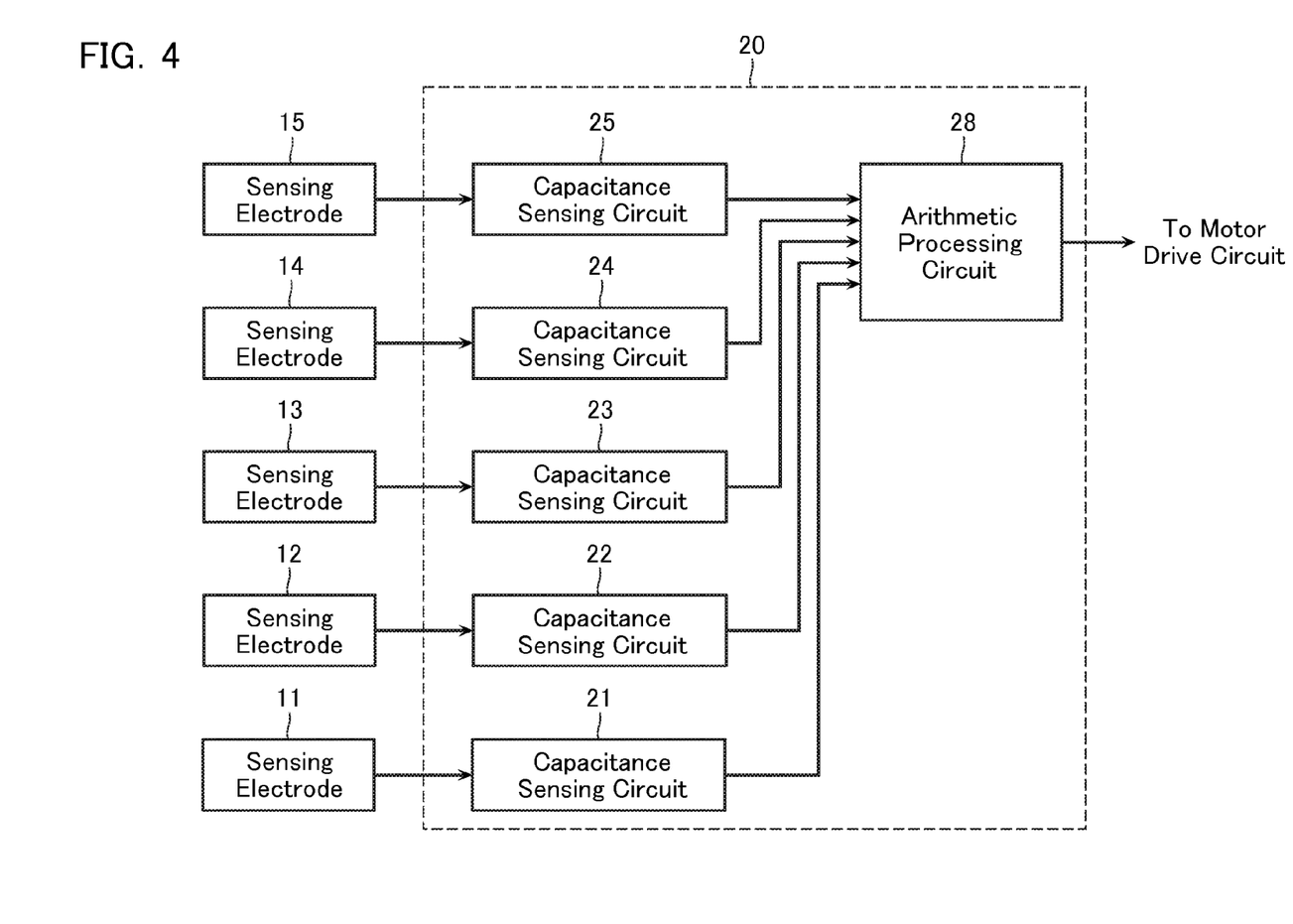
FIG. 4 is a block diagram showing an example of a total structure of a device for measuring a distance between a head and a headrest according to one embodiment of the present invention.

FIG. 3 is a block diagram showing an example of a total structure of a headrest-position adjusting device according to one embodiment of the present invention. FIG. 4 is a block diagram showing an example of a total structure of a device for measuring a distance between a head and a headrest according to one embodiment of the present invention. As shown in FIGS. 1 to 3, a headrest-position adjusting device 100 is constructed as follows:

That is, the headrest-position adjusting device 100 is mounted on a seat 40 of a vehicle or the like, and includes, for example, a distance measuring device 10 provided in a headrest front portion 43c constituting a part of a headrest 43 of the seat 40, a drive motor unit 30B provided in a headrest back portion 43d constituting another part of the headrest 43, and a drive motor unit 30A provided in a backrest (back seat) 41 of the seat 40. The distance measuring device 10 and the drive motor units 30A, 30B are electrically connected to each other through, for example, a harness 29.

The headrest front portion 43c is driven by, for example, the drive motor unit 30B, and is connected to the headrest back portion 43d through a support shaft 43b to be freely movable in the frontward-rearward direction of the vehicle. The headrest back portion 43d is driven by, for example, the drive motor unit 30A, and is connected to a backrest (a back seat) 41 of the seat 40 through a support shaft 43a to be freely movable in the upward-downward direction (the height direction of the headrest 43) and leftward-rightward direction of the vehicle.

Incidentally, the headrest 43 including the headrest front portion 43c and the headrest back portion 43d are made of cushioning material such as polyurethane which can receive safely a head 49 of a human body 48 sitting in a sitting section of the seat 40 even if the human body 48 is subject to impact.

For example, the distance measuring device 10 includes a plurality of sensing electrodes 11 to 15 formed on one surface (front surface) of a substrate 19, and a detecting circuit 20 formed (mounted) on the other surface (back surface) of the substrate 19. The distance measuring device 10 detects capacitance values based on capacitances from the sensing electrodes 11 to 15, detects a head 49 of a human body 49 sitting on a sitting portion 42 of the seat 40, and measures a distance between the headrest front portion 43c and the head 49.

The substrate 19 is constituted by, for example, a flexible printed board, a rigid substrate, or a rigid flexible substrate. The plurality of sensing electrodes 11 to 15 are made of a conductive material such as copper, a copper alloy, aluminum, etc. which is patterned on a base film (not shown) of the substrate 19 made of an insulating material such as polyethylene terephthalate (PET), polyethylene naphthalate (PEN), polyimide (PI), polyamide (PA), a glass epoxy resin, etc.

The plurality of sensing electrodes 11 to 15 may be formed of a member such as a general electric wire, conductive film, or the like. Where the sensing electrodes are mounted on the surface of the headrest front portion 43c, they can be formed of transparent electrodes. In this case, the substrate is formed of a panel or film having transparency, and each of the sensing electrodes 11 to 15 may be formed of a transparent electrode.

Incidentally, the transparent electrode can be made of, for example, tin-doped indium oxide (ITO), polyethylene dioxythiophen/polystylene sulfonic acid (PEDOT/PSS), polyethylene dioxythiophen/toluene sulfonate (PEDOT/TsO), or the like.

The plurality of sensing electrodes 11 to 15 are provided in the headrest front portion 43c at a portion close to the front surface thereof, formed into a rectangular strip shape having its longer dimension extend in the width direction (leftward-rightward direction) of the headrest 43 perpendicular to the height direction of the headrest 43, and arranged side by side with their widths lined up along the height direction of the headrest 43.

Electrode numbers 1 to 5 (N1 to N5 or ch1 to ch5) are allocated to the plurality of sensing electrodes 11 to 15 respectively. There are provided five sensing electrodes 11 to 15, but it is only necessary to provide such a number of electrodes as are necessary for sensing a capacitance between the head 49 of the human body 48 sitting on the seat 40 and the headrest 43 while the headrest 43 is at rest. It is preferable if there are provided three or more electrodes.

Further, in the present example, the sensing electrodes 11 to 15 are arranged side by side along the height direction. If, for example, the headrest front portion 43c is made to be movable exclusively in the frontward-rearward direction of the vehicle, the sensing electrodes 11 to 15 may be arranged side by side along the leftward-rightward direction, or along the oblique direction intersecting the height direction or leftward-rightward direction of the vehicle.

As will be described in detail later, the distance measuring device 10 calculates a high-degree curve connecting continuously the capacitance values as actual fixed points based on capacitance values detected in the measurement process, position information representing the positions of the sensing electrodes 11 to 15 in the headrest front portion 43c, and for example, a preset high-degree function of at least three. Along with this, the distance measuring device 10 calculates a high-degree coefficient of the high-degree curve, and measures the distance between the headrest front portion 43c and the head on the basis of the calculation result (highest-degree coefficient contained in the calculation result, or the like).

The detecting circuit 20 of the distance measuring device 10 defines the sensing electrodes 11 to 15 as actual fixed points in a two-dimensional coordinate system with capacitance values on y-axis and positions of the sensing electrodes 11 to 15 on x-axis on the basis of the capacitance values depending on the capacitances from the sensing electrodes.

Along with this, the detecting circuit 20 calculates a high-degree curve connecting continuously the actual fixed points in order to define the points among the sensing electrodes 11 to 15 as virtual fixed points. Further, the detecting circuit 20 may calculate the estimated central position in the height direction of the head 49 on the basis of the calculated high-degree curve. The estimated central position in the height direction of the head 49 is defined, for example, as a center of a line connecting the corner of an eye with the center of a ear in the head 49 beforehand.

As shown in FIG. 4, the detecting circuit 20 includes a plurality of capacitance sensing circuits 21 to 25 which output information indicating the capacitances sensed by the sensing electrodes 11 to 15. The detecting circuit 20 also includes an arithmetic processing circuit 28 which is connected to the capacitance sensing circuits 21 to 15. The arithmetic processing circuit 28 calculates the electrode-head distance described above and the height position of the head 49 using the capacitance values, position information and high-degree function on the basis of the information output from the capacitance sensing circuits 21 to 25 to output these arithmetic result information to motor driving circuits 31 (see FIG. 3) in the drive motor units 30A, 30B.

The plurality of capacitance sensing circuits 21 to 25 generate a pulse signal having a duty ratio which changes in accordance with the level of the capacitance between each of the sensing electrodes 11 to 15 and the head 49 and smooth the pulse signal, and output the sensing signal. Each of the capacitance sensing circuit 21 to 25 has a C-V converting function for converting capacitance to voltage, and comprises, for example, a known circuit for measuring CR charge-discharge time, a circuit transferring charge to a known capacitor, a circuit for measuring impedance, a circuit constituting an oscillating circuit and measuring oscillating frequency, and the like.

The arithmetic processing circuit 28 comprises, for example, CPU, RAM, ROM and the like, and performs a variety of arithmetic processing on the basis of the capacitance value from each of the capacitance sensing circuits 21 to 25. Then, the arithmetic processing circuit 28 outputs a control signal of the calculating result information to the drive motor unit 30B which changes the position of the headrest 43 and the drive motor unit 30A which changes the positions of the drive motor unit 30B and headrest back portion 43d.

The drive motor units 30A, 30B are provided with a motor driving circuit 31 which controls a drive motor 32 to change the position of the headrest 43 on the basis of control signal of calculation result from the arithmetic processing circuit 28 calculating on the basis of the information from each of the capacitance sensing circuits 21 to 25, and with the driving motor 32 which actually moves the position of the headrest 43 under the control with the motor driving circuit 31.

More concretely, the drive motor unit 30B is configured to drive the support shaft 43b of the headrest front portion 43c to freely move in the frontward-rearward direction by means of the drive motor 32 on the basis of the measurement result of the distance measuring device 10. The drive motor unit 30A is configured to drive the support shaft 43b of the headrest back portion 43d to freely move in the upward-downward direction (and the leftward-rightward direction) on the basis of the measurement result of the distance measuring device 10.

The detecting circuit 20 of the distance measuring device 10 is connected to a seat control circuit 2 which controls, for example, motion of the seat 40 (for example, sliding movement in the frontward-rearward direction, diagonal movement of the seat back 41, and movement of the sitting portion 42 in the upward-downward direction). The detecting circuit 20 is configured to output various information (for example, motion correction information due to difference in the frontward-rearward positions of the seat 40, and the like) together with the signal from the seat control circuit 2.

In the headrest position adjusting device 100 constructed in this manner, each of the sensing electrodes 11 to 15 of the distance measuring device 10 detects the capacitance between the head 49 and the headrest position adjusting device 100. Then, the arithmetic processing circuit 28 calculates high-degree curve and the highest-degree coefficient thereof using the capacitance value, the position information of each of the sensing electrodes 11 to 15, and the preset high-degree function with a degree of at least three.

Thereafter, position adjustment for the headrest 43 can be performed, specifically by moving the position of the headrest front portion 43c in the frontward-rearward direction of the vehicle in the basis of the measurement result from the distance measuring device 10 which is obtained by measuring the distance between the headrest front portion 43c and the head 49 based on the calculation result (the highest-dimension coefficient included therein).

Figure 5:
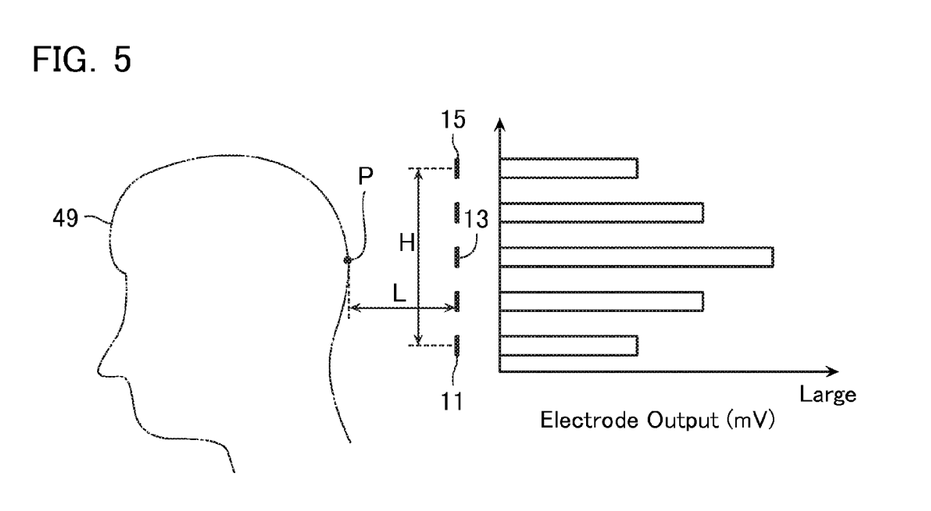
FIG. 5 is an explanatory view showing an example of output of a sensing electrode in the distance measuring device.
Figure 6:
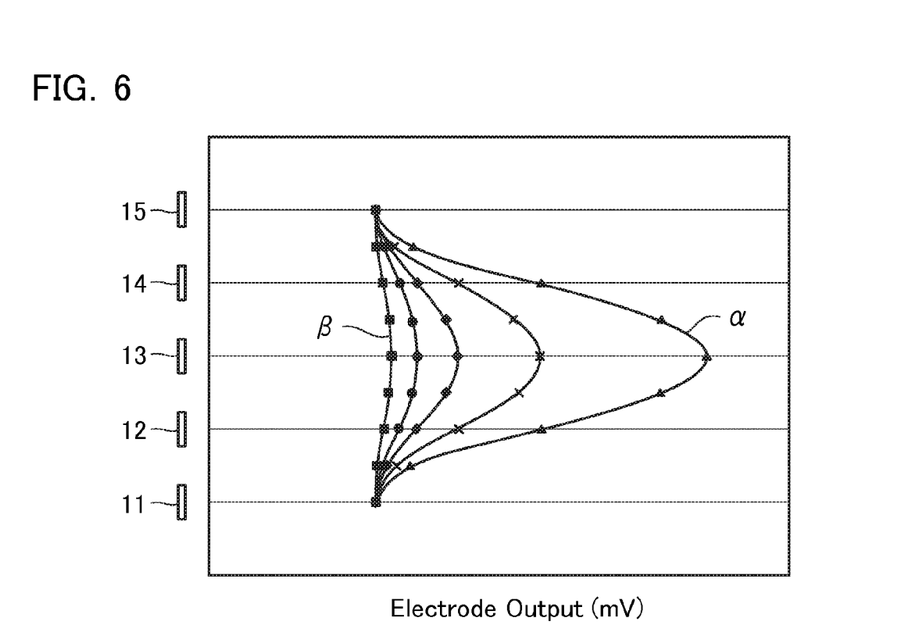
FIG. 6 is a view showing results obtained by high-degree function approximating capacitance value between each sensing electrode and a head in the distance measuring device.
Figure 7:
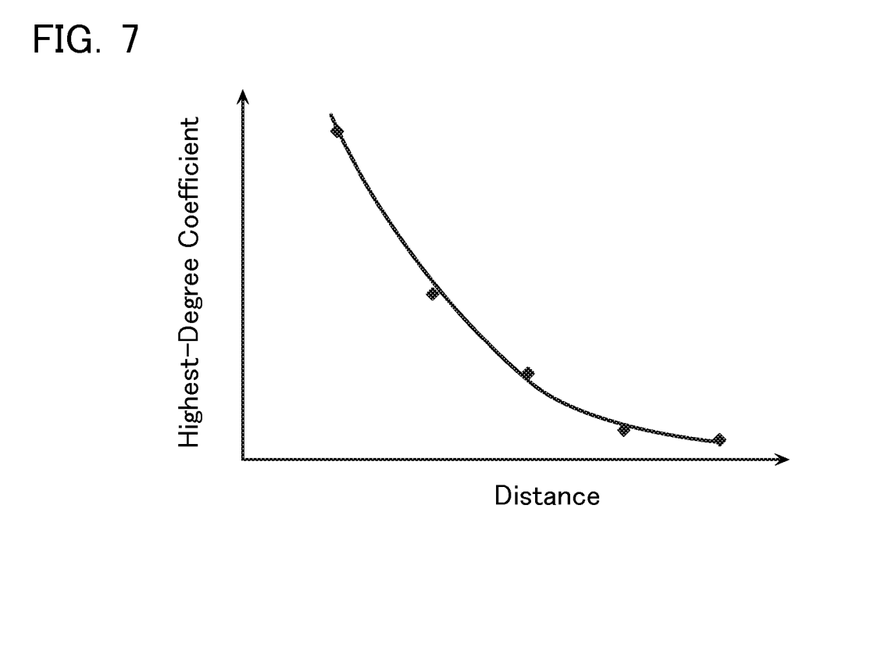
FIG. 7 is a view showing a correlation between high-degree coefficient and a distance between each sensing electrode and a head in the distance measuring device.

FIG. 5 is a explanatory diagram showing an example of the outputs of the sensing electrodes 11 to 15 of the distance measuring device 10. FIG. 6 is a diagram showing results obtained by high-degree approximating the capacitance value between the head 49 and each of the sensing electrodes 11 to 15 in the distance measuring device 10. FIG. 7 is a graph showing correlation between the highest-degree coefficient and the distance between the head 49 and each of the sensing electrodes 11 to 15 in the distance measuring device 10.

For example, as shown in FIG. 5, when the height-direction center position of the head 49 is defined as P and the distance between the sensing electrodes 11 to 15 and this center position P, which exists within an electrode-electrode distance H between the sensing electrode 15 at the uppermost position and the sensing electrode 11 at the lowermost position, is defined as L, output values of the sensing electrodes 11 to 15 will be as follows.

That is, if the electrode-head distance L is within a predetermined range and the vicinity of the side-by-side arrangement direction center of the sensing electrodes 11 to 15 (i.e., the vicinity of the center of the headrest front portion 43c) and the center position P of the head 49 face each other substantially horizontally, the output value (capacitance value) of the sensing electrode 13 is the largest output value and the output values (capacitance values) of the sensing electrodes 15 and 11 which are located at the highest position or the lowest position are the smallest output values.

FIG. 6 shows the result obtained by high-degree approximating the capacitance values between the head 49 and the sensing electrodes 11 to 15 having such output properties using high-degree function with a degree of at least three. For example, a high-degree curve connecting continuously at least three (at least five in this case) actual fixed points is calculated, which is represented in a two-dimensional coordinate system with capacitance values on y-axis and positions of the sensing electrodes 11 to 15 on x-axis.

As a result, like the high-degree curve α in FIG. 6, the smaller the distance L becomes, the curve comes to have a shape with the sharper peak (that is, the unevenness of the head 49 becomes remarkable). On the other hand, like the high-degree curve β in FIG. 6, the larger the distance L becomes, the curve comes to have the gentler shape. In the present example, since the arithmetic processing circuit 28 calculates high-degree curve of the output in the two-dimensional coordinate system by high-degree approximation described above in order to define the sensing electrodes 11 to 15 with electrode number of 1 to 5 as actual fixed points, and to define the points among the sensing electrodes 11 to 15 (for example, a point between the sensing electrode 11 and the sensing electrode 12) as virtual fixed points.

Then, the applicant has examined correlation between the distance L and the high-degree function coefficient in order to determine the distance L from the shapes of the high-degree curves, and has found that the highest-degree coefficient represents uneven shape of the head 49 and changes depending on the distance L. For example, where the high-degree function approximation is performed using four-degree function $y = ax^4 + bx^3 + dx + e$, it is judged that the coefficient "a" of the first term $ax^4$ (that is, the highest-degree coefficient) correlates with the distance L.

This coefficient "a" represents such an intrinsic correlation that when the distance L becomes large, the coefficient "a" becomes small, and when distance L becomes small, the coefficient "a" becomes large, without being affected by outer noise due to change in environment such as a temperature or humidity.

Accordingly, the distance measuring device 10 according to the present example can measure the distance L between the headrest front portion 43c and the head 49 by letting the arithmetic processing circuit 28 of the detecting circuit 20 use the highest-degree coefficient value and compare it with the correlation data as shown in FIG. 7. Then, the headrest position adjusting device 100 including this distance measuring device 10 adjusts the position of the headrest 43 back and forth based on a measurement result obtained by the distance measuring device 10.

Figure 8:
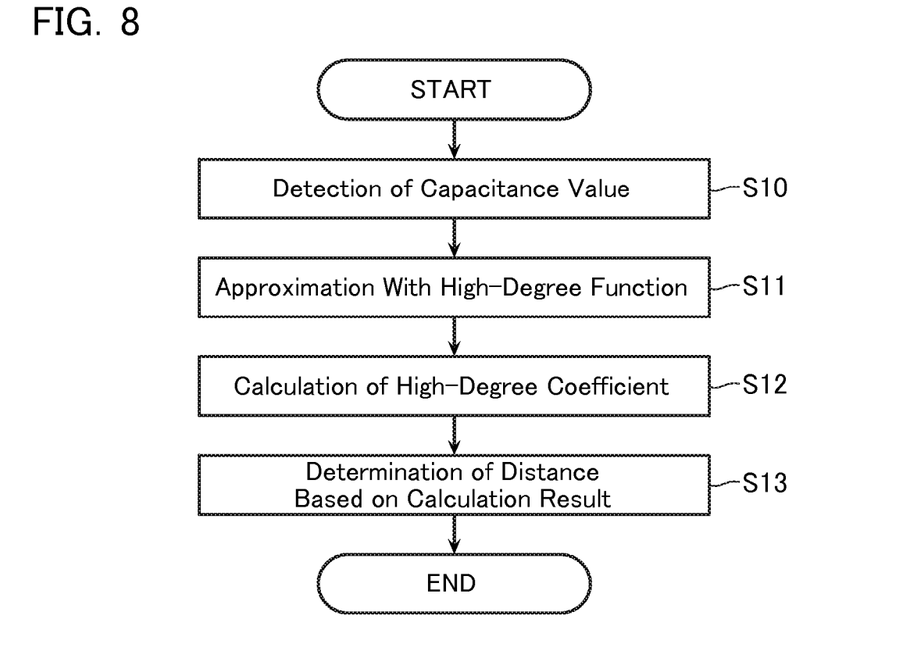
FIG. 8 is a flow chart showing an example of distance measuring procedure using a method of measuring a distance between a headrest and a head according to one embodiment of the present invention.

FIG. 8 is a flowchart showing one example of the procedures of a distance measuring process by a method for measuring the distance between a headrest and a head according to one embodiment of the present invention. As shown in FIG. 8, first, the distance measuring device 10 detects capacitance values which are based on capacitances sensed by the sensing electrodes 11 to 15 with respect to the head 49 (step S10).

Next, based on the detected capacitance values and the position information of the sensing electrodes 11 to 15, high-degree curve is calculated and approximated by high-degree function in the two-dimensional coordinate system with capacitance values on y-axis and positions of the sensing electrodes on x-axis (step S11), and the highest-degree coefficient is calculated (step S12). On the basis of this calculation result, the distance L is determined by comparing the highest-degree coefficient with the data of the correlation described above (step S13), whereby the measurement is finished.

Figure 9:
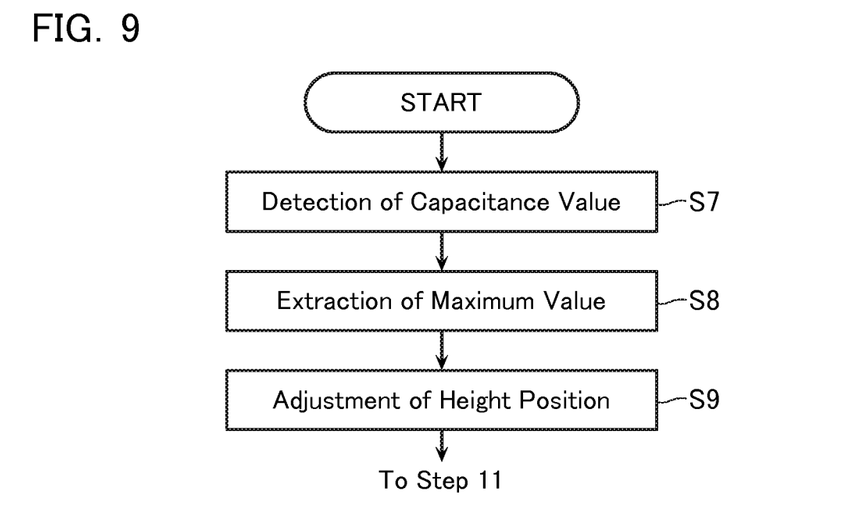
FIG. 9 is a flow chart showing another example of the distance measuring procedure.

In this case, the distance measurement may be performed by the following procedure. FIG. 9 is a flowchart showing another example of the procedures of a position measuring process. In the following description, any portions that are the same as those already explained will be denoted by the same reference numerals and explanation thereof will not be provided. As shown in FIG. 9, the distance measuring device 10 detects capacitance values which are based on capacitances sensed by the sensing electrodes 11 to 15 with respect to the head 49 (step S7).

Next, the distance measuring device 10 extracts the maximum value of the detected capacitance (step S8). Based on the maximum value, the headrest back portion 43d is moved to adjust the height position thereof (step S9). The procedure goes to step S11 described above, and performs the subsequent process to measure the distance L. In the height adjustment in step S9, the headrest back portion 43d is moved up and down such that the maximum value positions in the intermediate portion between the sensing electrode 15 at the uppermost position and the sensing electrode 11 at the lowermost position (that is, in the vicinity of the center of the headrest front portion 43c).

Figure 10:
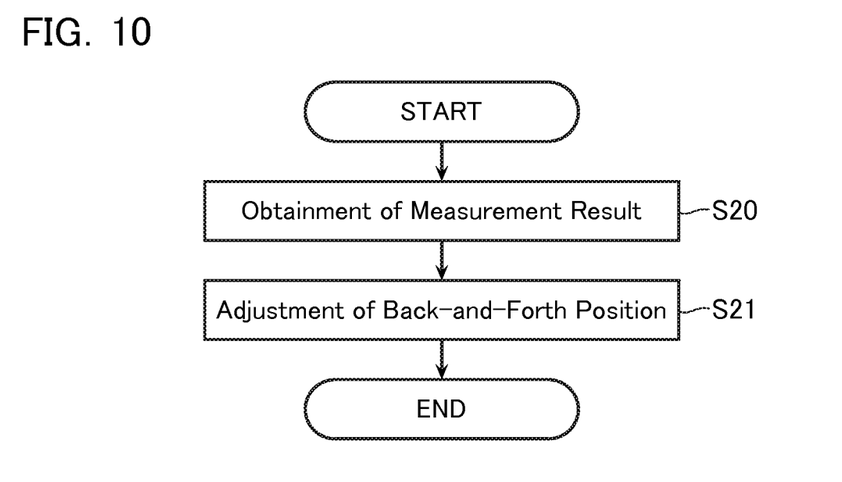
FIG. 10 is a flow chart showing an example of distance measuring procedure using a method of adjusting a position of a headrest according to one embodiment of the present invention.

Thus, if the height position of the headrest 43 is adjusted beforehand when the distance L is measured, it is possible to measure more precisely the distance L between the headrest front portion 43c and the head 49. Then, the headrest position adjusting device 100 adjusts the position of the headrest 43 using the measured distance L as follows:

FIG. 10 is a flowchart showing an example of the procedures of a headrest position adjusting process by a headrest position adjusting method according to one embodiment of the present invention. Because the headrest position adjusting device 100 described above includes the distance measuring device 10, the arithmetic processing circuit 28 of the detecting circuit 20 has also a function as a control unit for controlling the entire headrest position adjusting device 100.

Here, a position adjusting process for adjusting the headrest 43 in the frontward-rearward direction will be explained. First, the headrest position adjusting device 100 obtains the measurement results including the distance measured by the distance measuring device 10 (step S20). Then, the headrest position adjusting device 100 moves the headrest front portion 43c in the frontward-rearward direction of the vehicle based on the obtained measurement result (step S21), whereby the measurement is finished.

The position adjustment in the frontward-rearward direction is specifically performed such that, where the desired distance L is 50 mm, the headrest front portion 43c is moved 20 mm in the front direction when the measured distance L is 70 mm, and the headrest front portion 43c is moved 20 mm in the rear direction when the measured distance L is 30 mm.

Thus, according to the headrest position adjusting device 100 including the distance measuring device 10 of the present embodiment, it is possible to highly accurately measure the distance between a head and a headrest without being affected by external noise while the headrest 43 is at rest, and automatically adjust the back-and-forth position of the headrest 43 using the measurement result. Further, since the headrest does not move wastefully, the vehicle occupant does not feel uncomfortable. For example, even if the head 49 moves during scanning of capacitance, it is possible to measure the distance L while following the movement.

What is claimed is:

1. A device for measuring a distance between a headrest and a head, comprising:
   at least three sensing electrodes provided in the headrest arranged on a seat of a vehicle, each sensing capacitance between a head of a human body sitting on the seat and the headrest;
   detecting means for detecting at least three capacitance values, each corresponding to the respective capacitances from the at least three sensing electrodes;
   calculating means for calculating, by using the at least three capacitance values detected by the detecting means and position information showing an arrangement position of each of the sensing electrodes in the headrest, a coordinate of each of the at least three capacitance values on a two-dimensional coordinate system, the two-dimensional coordinate system taking a position of the sensing electrode on x-axis and taking the capacitance value on y-axis,
   calculating a high-degree curve of at least three degree connecting continuously the calculated coordinate of each of the at least three capacitance values, by using a preset high-degree function of at least three degree, and calculating a highest-degree coefficient of the high-degree curve; and
   distance measuring means for determining a distance between the headrest and the head using the calculated highest-degree coefficient of the high-degree curve.

2. The device for measuring a distance between a headrest and a head according to claim 1, wherein the plurality of sensing electrodes are arranged along a height direction of the headrest.

3. A headrest position adjusting device comprising a device for measuring a distance between a headrest and a head, and position adjusting means for adjusting a position of the headrest by moving the headrest back and forth with regard to a vehicle based on the measurement result from the device for measuring a distance between a headrest and a head, wherein the device for measuring a distance between a headrest and a head comprises:
   at least three sensing electrodes provided in the headrest arranged on a seat of a vehicle, each sensing capacitance between a head of a human body sitting on the seat and the headrest;
   detecting means for detecting at least three capacitance values, each corresponding to the respective capacitances from the at least three sensing electrodes;
   calculating means for calculating, by using the at least three capacitance values detected by the detecting means and position information showing an arrangement position of each of the sensing electrodes in the headrest, a coordinate of each of the at least three capacitance values on a two-dimensional coordinate system, the two-dimensional coordinate system taking a position of the sensing electrode on x-axis and taking the capacitance value on y-axis,
   calculating a high-degree curve of at least three degree connecting continuously the calculated coordinate of each of the at least three capacitance values, by using a preset high-degree function of at least three degree, and calculating a highest-degree coefficient of the high-degree curve; and
   distance measuring means for determining a distance between the headrest and the head using the calculated highest-degree coefficient of the high-degree curve.

4. A method for measuring a distance between a headrest and a head, comprising:
   sensing capacitance between the head of a vehicle occupant of a human body sitting in a seat of a vehicle and the headrest by means of at least three sensing electrodes provided in the headrest arranged on the seat of the vehicle;
   detecting at least three capacitance values, each corresponding to the respective capacitances sensed by the at least three sensing electrodes;
   calculating, by using the detected at least three capacitance values and position information showing an arrangement position of each of the sensing electrodes in the headrest, a coordinate of each of the at least three capacitance values on a two-dimensional coordinate system, the two-dimensional coordinate system taking a position of the sensing electrode on x-axis and taking the capacitance value on y-axis;
   calculating a high-degree curve of at least three degree connecting continuously the calculated coordinate of each of the at least three capacitance values, by using a preset high-degree function of at least three degree;
   calculating a highest-degree coefficient of the high-degree curve; and determining a distance between the headrest and the head using the calculated highest-degree coefficient of the high-degree curve.

5. The method for measuring a distance between a headrest and a head according to claim 4, wherein the plurality of sensing electrodes are arranged along a height direction of the headrest, and the method further comprises, prior to said calculating step, a step of adjusting a position of the headrest in the height direction based on the capacitance value and the position information detected by said detecting step, such that the maximum of the detected capacitance value resides between the capacitance value detected by the sensing electrode located at a highest position of the headrest among the plurality of sensing electrodes and the capacitance value detected by the sensing electrode located at a lowest position of the headrest among the plurality of sensing electrodes.

6. A method for adjusting a position of a headrest comprising:

sensing capacitance between the head of a vehicle occupant of a human body sitting in a seat of a vehicle and the headrest by means of at least three sensing electrodes provided in the headrest arranged on the seat of the vehicle;

detecting at least three capacitance values, each corresponding to the respective capacitances sensed by the at least three sensing electrodes;

calculating, by using the detected at least three capacitance values and position information showing an arrangement position of each of the sensing electrodes in the headrest, a coordinate of each of the at least three capacitance values on a two-dimensional coordinate system, the two-dimensional coordinate system taking a position of the sensing electrode on x-axis and taking the capacitance value on y-axis;

calculating a high-degree curve of at least three degree connecting continuously the calculated coordinate of each of the at least three capacitance values, by using a preset high-degree function of at least three degree;

calculating a highest-degree coefficient of the high-degree curve;

determining a distance between the headrest and the head using the calculated highest-degree coefficient of the high-degree curve; and adjusting the position of the headrest by moving the headrest back and forth with regard to a vehicle based on the determined distance between the headrest and the head.

* * * * *